A. YOUNGS.
Evaporating Apparatus.

No. 102,643. Patented May 3, 1870.

Witnesses.
C. C. Wilson
Edmund Masson

Alanson Young.
By atty. A. B. Stoughton.

United States Patent Office.

ALANSON YOUNGS, OF BERLIN, MICHIGAN.

Letters Patent No. 102,643, dated May 3, 1870.

---

IMPROVEMENT IN EVAPORATING APPARATUS.

---

The Schedule referred to in these Letters Patent and making part of the same.

---

*To all whom it may concern:*

Be it known that I, ALANSON YOUNGS, of Berlin, in the county of Ionia and State of Michigan, have invented certain new and useful Improvements in Evaporating Apparatus; and I do hereby declare the following to be a full, clear, and exact description of the construction and operation of the same, reference being had to the accompanying drawings, making a part of this specification, in which—

Similar letters of reference, where they occur in the separate figures, denote like parts of the apparatus in both of the drawings.

The object and purpose of my invention is to make a cheap and durable evaporator that is readily drained or emptied, and protected against rain, dust, insects, &c., and thus kept clean, which is important, particularly in the evaporation of saccharine matter, sirups, &c.

To enable others skilled in the art to make and use my invention, I will proceed to describe the same with reference to the drawings.

The bottom $a$ of the evaporating-pan or vessel is made of galvanized iron, or other non-corrosive metal, and its ends $b\ b$ are turned up, so as to form the ends of the pan or vessel.

The sides $A\ A'$ of the evaporator are made of wood, as are also the partitions $c\ c\ c$, which divide the interior of the pan into several compartments, as shown, said partitions $c$ being let into the side pieces a short distance, and the whole vessel is made strong and tight by nails driven through the metal bottom and ends into the sides and walls or partitions thereof.

By this construction, soldering, which invariably gives way under the constant expansion and contraction of the pan or vessel, by the heat and absence of heat under and around it, is dispensed with, and yet the vessel is tight.

An evaporating-pan or vessel constructed as above described, can be set upon walls $B\ B$, so that the wood portions or sides will be shielded or protected from the fire which is used in the space or furnace C, and thus the entire bottom of the vessel may be exposed to the flame or heat.

Figure 1:
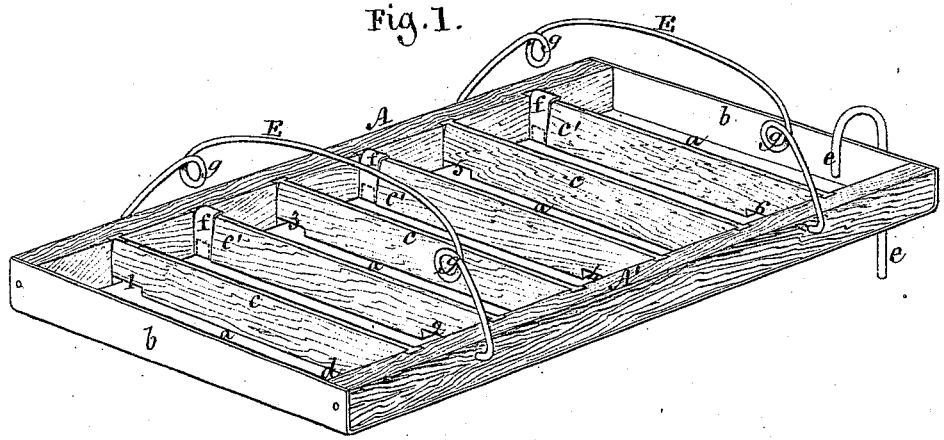
Figure 1 represents in perspective the evaporating-pan or vessel, with its appliances, separated or removed from the furnace, over which it is placed when in use, and divested of its cover.
Figure 2:
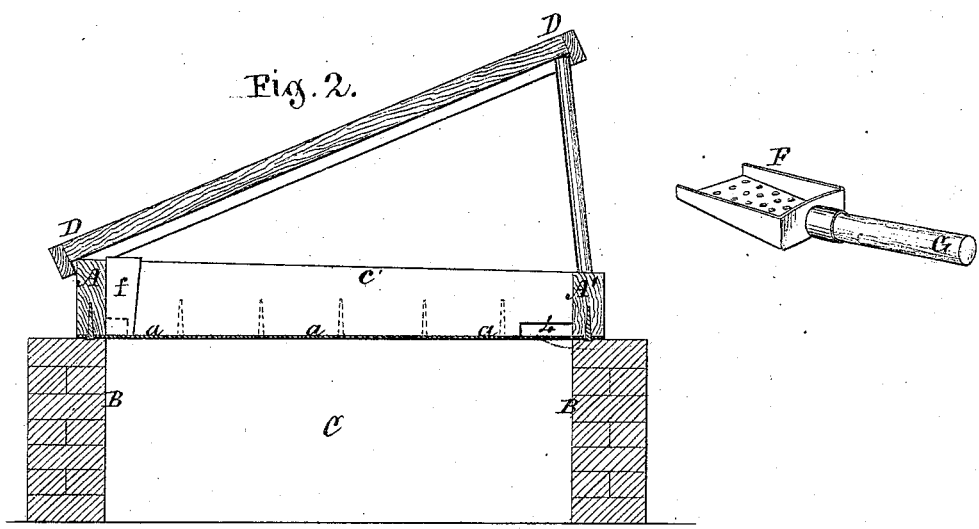
Figure 2 represents a vertical transverse section taken through the cover, pan, and furnace, said cover being represented as raised up at one side of the pan.

To protect the interior of the evaporator or its contents from rain, dust, insects, or other injurious matter, I use a cover, D, made of wood, put together in any light, strong, and durable manner, and to allow the vapor to freely escape from the pan, the cover may be raised up at one side, as shown in fig. 2, and still it will shield the pan and its contents.

It is best to raise up the leeward side of the cover, so that the wind will strike and pass over the cover, and not blow its dust into the pan or vessel.

It will be perceived that the side A of the pan or vessel is higher or deeper than the other side A', for a purpose to be presently explained.

The liquid to be evaporated is fed into the pan at the corner $d$; thence it passes through the first compartment across the pan, and through the opening 1, into the second compartment; thence through said second compartment and through the opening 2, into the third compartment, and so on through the several compartments and openings 3, 4, 5, and 6, to where it is siphoned off by a siphon, $e$.

It will thus be seen that the liquid passes back and forth through the entire series of compartments before it arrives at the point where it is drawn off.

In the intermediate walls or partitions $c'\ c'\ c'$, and in the line of the openings 1 3 5, in the partitions $c$, there are made a series of openings, shown in the drawings by dotted lines, which are respectively covered by a slide, $f$, to keep them closed during the evaporating process; but when the vessel or pan is to have its contents drained to the draw-off point or part, the vessel is slightly tilted, so that the contents will run toward the high side A of the pan or vessel; the gates or slides $f$ are then raised, and thus open a direct communication between all the compartments and that from which the liquid is finally drawn off.

To handle, incline, or remove the pan or vessel from the furnace, removable bails E E are used, which have loops or rings $g\ g$ formed in or connected with them, through any or all of which levers or handles can be applied to raise the pan or vessel in whole or in part, as may be required.

F represents a strainer or skimmer, for clearing the liquid or sirup of all extraneous matter during the process of evaporation.

It is furnished with a handle, G, and of a width to conform to the width of the compartments, so as to take up and strain the whole contents of the compartment at one pass.

Having thus fully described the nature, object, and purpose of my invention,

What I claim therein as new, and desire to secure by Letters Patent, is—

An evaporating-pan or vessel, constructed, arranged, and operating substantially in the manner and for the purpose herein described and represented.

ALANSON YOUNGS. [L. S.]

Witnesses:
   C. O. THOMPSON,
   E. LE VALLEY.